US006528564B1

(12) United States Patent
Xia

(10) Patent No.: US 6,528,564 B1
(45) Date of Patent: Mar. 4, 2003

(54) ARTICLES COMPRISING NOVEL POLYMERIC BLUE ANTHRAQUINONE-DERIVATIVE COLORANTS

(75) Inventor: Jusong Xia, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/976,139

(22) Filed: Oct. 12, 2001

(51) Int. Cl.[7] .............................. C08J 5/10; C08L 31/06
(52) U.S. Cl. ........................................ 524/242; 524/241
(58) Field of Search ................................ 524/242, 241, 524/236, 238, 239, 240

(56) References Cited

U.S. PATENT DOCUMENTS

| | | | | |
|---|---|---|---|---|
| 4,137,243 A | * | 1/1979 | Farmer ........................ 260/378 |
| 4,846,846 A | * | 7/1989 | Rekers et al. ................... 8/515 |
| 4,999,418 A | | 3/1991 | Krutak et al. ................ 528/272 |
| 5,131,919 A | * | 7/1992 | Mausezahl ..................... 8/643 |
| 5,688,899 A | * | 11/1997 | Strand et al. ................ 528/279 |
| 5,859,116 A | * | 1/1999 | Shih .......................... 524/493 |

\* cited by examiner

Primary Examiner—James J. Seidleck
Assistant Examiner—U. K Rajguru
(74) Attorney, Agent, or Firm—Terry T. Moyer; William S. Parks

(57) ABSTRACT

A blue colorant comprising a chromophore having at least one poly(oxyalkylene) chain attached, through aromatic amino group (or groups), to the 1-position, the 4-position, or both, of an anthraquinone backbone is provided. Such colorants exhibit excellent amine/base stability and thermal stability, effective colorations, excellent low extraction rates, and high lightfastness levels, particularly when incorporated within certain media and/or on the surface of certain substrates, particularly polyesters, polyolefins, and polyurethanes. The poly(oxyalkylene) chain or chains can be conveniently tailored to increase the solubility or compatibility in different solvents or resins thereby permitting the introduction of such excellent coloring chromophores within diverse media and/or or diverse substrates as well as provides a liquid colorant which facilitates handling. Compositions and articles comprising such colorants are provided as well as methods for producing such inventive colorants.

60 Claims, No Drawings

US 6,528,564 B1

ARTICLES COMPRISING NOVEL POLYMERIC BLUE ANTHRAQUINONE-DERIVATIVE COLORANTS

FIELD OF THE INVENTION

This invention relates to an inventive blue colorant comprising a chromophore having at least one poly(oxyalkylene) chain attached, through aromatic amino group (or groups), to the 1-position, the 4-position, or both, of an anthraquinone backbone. Such colorants exhibit excellent amine/base stability and thermal stability, effective colorations, excellent low extraction rates, and high lightfastness levels, particularly when incorporated within certain media and/or on the surface of certain substrates, particularly polyesters, polyolefins, and polyurethanes. The poly(oxyalkylene) chain or chains can be conveniently tailored to increase the solubility or compatibility in different solvents or resins thereby permitting the introduction of such excellent coloring chromophores within diverse media and/or or diverse substrates as well as provides a liquid colorant which facilitates handling. Compositions and articles comprising such colorants are provided as well as methods for producing such inventive colorants.

DISCUSSION OF THE PRIOR ART

All U.S. patents cited within this specification are hereby incorporated by reference.

There continues to be a need to provide versatile colorants within various applications such that the coloring agent itself exhibits excellent colorations high thermal stability and amine/base stability, excellent lightfastness, low extraction (or drastic reduction in possibility of removal therefrom via extraction by solvents or like sources), ease in handling, ability to mix thoroughly with other coloring agents and thus to provide effective different hues and tints within or on target substrates, and acceptable toxicity levels. There has been a need to provide improved colorants meeting this criteria for certain thermosets such as polyurethane foam applications, and thermoplastic media, such as polyesters, such that the colorants themselves exhibit excellent compatibility therein (for instance in terms of intrinisic viscosity loss and the other characteristics desired for such plastics as noted above). In particular, such characteristics for polyesters are desired for colorants that absorb, for example, though not necessarily, within the blue portion of the visible spectrum. It is believed and, as noted above, has been determined that such desirable polyester plastic colorations with the characteristics noted above are possible through the addition of certain pendant groups [such as, for example poly(oxyalkylene) groups] to the chromophore backbone which do not act as couplers or color modifiers and thus ay chromophore (and resultant hue or tint) may be utilized with the inventive anthraquinone chromophore itself.

Previous coloring agents for such end-uses have included pigments, dyes, or dyestuffs, with each having its own drawback, be it an extraction problem from the finished article, a handling problem during manufacturing due to solid dust particles, or a staining problem, due to the difficulty associated with cleaning coloring agents from manufacturing machinery after colored plastic production, and other like issues. As a result, the application of such pigments, dyes, and/or dyestuffs as colorants within plastics (such as polyesters, polyolefins, polyurethanes, and the like) is greatly limited and far from satisfactory due to such physical limitations. However, the utilization of such colorants is highly desired for the hues and shades they provide, within the ultimate thermoplastic and thermoset articles themselves. As a result, there is a clear desire to provide easier to handle, more thermally stable, less extractable, more base/amine stable, more compatible with to-be-colored substrates or resins, easy-to-clean, etc, coloring agents for introduction within thermoplastic and thermoset articles to provide decorative, aesthetic, and other like effects. Facilitating the introduction of such chromophores within such formulations is thus a highly desired target within the colored thermoplastic and thermoset industry, whether it be in terms of handling, thermal stability, extraction, base/amine stability, compatibility, cleaning, or the like.

Attempts to meet this desire have included the introduction of certain standard types of polymeric colorants within plastics (be they thermoplastics or thermoset types). Such colorants are primarily poly(oxyalkylenated) compounds, such as triphenylmethanes (i.e., those found within U.S. Pat. No. 4,992,204, to Kluger et al.) aliphatic amino anthraquinones (i.e., those found within U.S. Pat. No. 4,137,243 to Farmer, and U.S. Pat. No. 4,846,846 to Rekers et al.), and the like; however, they also tend to exhibit certain problems during incorporation into thermosets and/or thermoplastics. In thermosets such as polyurethane foam, many of these previously disclosed compositions, particularly those including the blue triphenylmethane colorants, exhibit discoloration problem in association with the basic catalysts utilized and/or with the high exotherm generated during target foam formation (triphenylmethane moieties of such colorants are susceptible to attack by nucleophilic catalysts and their residues); and for those colorants such as aliphatic amino anthraquinones (for example, Reactint® Blue X17 from Milliken & Company) are not stable to high TDI index during polyurethane foam formation (active hydrogen sites located on the chromophore have been observed to react with isocyanate groups to alter the shade of product). In thermoplastic compositions such as polyester, many of the previously disclosed compositions, particularly those including triphenylmethanes and/or aliphatic amino anthraquinones, are very unstable at within requisite processing temperature range. As a result, the colorations provided by such polymeric colorants may be reduced in strength or changed in shade under such circumstances. Other types of colorants have been discussed within the prior art, such as azos and diazos, but the specific colorations provided by such compounds are limited to certain hues and their utilization within polyesters is suspect from a number of perspectives (such as toxicity, lightfastness, thermal stability, and the like). There is thus a desire to introduce new types of colorants comprising different types of chromophores for the purpose of providing new, effective, versatile colorants for such myriad end-uses as noted above and that exhibit excellent colorations, extraction, thermal stability, amine/base stability, compatibility with other coloring agents and/or polymer additives and/or substrates/resins/media, as well as low toxicity.

In thermoplastics, particularly polyester, one approach to obtain the desired coloration has been to use difunctional dyes that possess the necessary pendant groups to allow them to be copolymerized, exemplified within U.S. Pat. No. 4,403,092 to Davis et al. Though such a method provides effectively colored thermoplastics with good performance such as excellent extraction (due to the copolymerized nature of the dyes), good lightfastness, and the like, there are many drawbacks to such technology. Primarily, such drawbacks include that the colorants have to be added during the polymerization of polyesters thus the necessity of dedicating a high cost polyester production vessel to color due to the inherent and difficult-to-remedy contamination of the vessel by the colorant (which invariably limits flexibility in manufacturing of resins). Furthermore, another drawback is the necessity of the end user or article manufacturer to store large varieties of colored resins of different shades, thus limits the flexibility and adds cost to the end user. The colorants disclosed, for example within U.S. Pat. No. 4,403,092, are inherently powdered or solid in nature and thus are not suitable for direct addition to the molten plastic during any injection molding step. Such powdered coloring agents are developed solely for actual polymerization within the target resin prior to any molding, injection, and other like process step. Drawbacks, thus, to these powdered types include undesirable dusting, contamination and staining of equipment, clogging (during feeding into the molten resin, for example), and poor control of metering during coloring of the target resin within and/or at the molding machinery. A more versatile colorant providing effective colorations when introduced at different steps during thermoplastic formation is thus highly desirable, particularly if these clean-up and contamination issues can be substantially avoided during utilization thereof. Other less noticeable drawbacks exist for such standard polyester coloring technology; however, these issues clearly show that improvements are highly desired, such as to provide easily handled liquid colorants for polyester which are thermally stable and offer excellent performance in areas such as extraction.

Another approach to coloration of thermoplastics such as polyesters and namely polyethylene terephthalate has been through the use of pigments (Thomas G. Weber, Editor, *Coloring of Plastics,* John Wiley and Sons, New York, 1979). The use of pigments (either neat or in a liquid dispersion), however, is accompanied by undesirable properties such as opacity, dullness of color, low tinctorial strength, and the like, associated with such pigment compounds and formulations. Also, difficulties in uniformly blending the insoluble pigments with the thermoplastic resin are encountered. In addition, with pigment dispersions, significant issues arise with transportation and storage due to the propensity for settling. Also there are problems with clean-ups due to the propensity of pigments for staining equipment (and possibly the personnel operating such equipment).

Anthraquinone-based colorants have been known in the art for a long period of time and are widely used due to their high color strength, broad range of shades, and many are thermally stable and base stable. More specifically, 1,4-aromatic amino substituted anthraquinone blue colorants such as that shown in Comparative Example 20 [1,4-di-para-anisidino-anthraquinone], below, are known in the art and are disclosed in JP 05,330,254 to Takuma et al., as thermal-transfer recording dyes; and in JP 03,087,754 to Koshida et al., as color toner composition which provides high-quality cyan images with good lightfastness; in GB 1,489,239 and U.S. Pat. No. 3,994,679 to Greenhalgh et al., as disperse dyestuffs for dyeing polyester textiles to give a marine blue shade; in U.S. Pat. No. 3,653,800 to Blackwell to dye cotton or polyester-cotton textiles. However, no teaching or fair suggestion of a polymeric version of such a colorant is known, nor is it taught nor fairly suggested that such a colorant could be used for the coloration of thermoplastics such as PET or PP, or thermosets such as polyurethane. In addition, anthraquinone blue colorants such as 1,4-bis(4-hydroxyphenyl amino)-anthraquinone are disclosed in U.S. Pat. Nos. 5,200,290, 4,778,742 and 4,645727 to Ong et al. Such colorants are to be used in reaction with diethyleneglycol bischloroformate, triethyleneglycol bischloroformate, and the like, to make solid blue polycarbonates, or with glutaryl chloride, adipoyl chloride, and the like, to make solid blue polyesters. The resultant blue polycarbonates or polyesters are then dissolved in isoparaffinic hydrocarbon etc to make blue liquid developer for image printing, or formulated with materials such as styrene-butadiene copolymer by melt blending techniques as blue toner compositions. Although this patent disclosed the blue-colored polyesters, the colorant itself is a solid small molecule and has to be copolymerized with other monomers during the formation of polyesters. Furthermore, there is no fair suggestion of blending 1,4-bis(4-hydroxyphenyl amino)-anthraquinone with polyester or polycarbonate resins to form colored articles. A similar version such as a 1,4-bis(2',6'-dimethyl-4'-substitutedphenyl amino)-anthraquinone dye was disclosed in U.S. Pat. No. 3,918,976. to Arai et al, to color polyester film as photographic film support. Although the solid dyes were mixed with PET chips and the mixture was kneaded and formed into a film by melt extrusion, and the dyes suggested in U.S. Pat. No. 3,918,976 showed improved sublimation resistance, it still significantly migrated to the surface of PET film and will not be able to use these version of dyes for other applications, particularly packaging et al. Furthermore, no fair mention is made of liquid polymeric derivatives of these colorants, nor is it taught nor fairly suggested that these colorants could be added during the molding step of polyester articles. Additionally, no teaching or fair suggestion of polymeric versions of such colorants with a poly(oxyalkylene) chain (or chains) are known, nor is it fairly taught any such polymeric colorants could be used to color thermosets such as polyurethanes. 1,4-Bis(4-hydroxyphenyl amino)-anthraquinone is also disclosed in JP 05,330,254 to Takuma, for utilization as a heat sensitive sublimation transfer recording cyan dye; in GB 2,071,681 to Whittaker to be dissolved in nonpolar fluorinated organic liquids to color refrigerants, manometer indicator fluids, and the like; and in DE 2,123, 454 to Neeff to be used to dye polyamide fibers and textiles. Meanwhile, GB 1,444,716 to Clark briefly mentioned the preparations of dyestuffs which contain mainly 1-hydroxy-4-(4-hydroxyphenylamino)-anthraquinone with by-product 1,4-Bis(4-hydroxyphenyl amino)-anthraquinone as a minor component. As noted above, no fair mention is made of liquid polymeric derivatives of these colorants, nor is it taught nor fairly suggested that these colorants could be added during the molding step of polyester articles. Addionally, no teaching or fair suggestion of polymeric versions of such colorants with poly(oxyalkylene) chain or chains is known, nor is it fairly taught any such polymeric colorants could be used to color thermosets such as polyurethanes.

To date, although some liquid colorants (other than less-than-reliable pigment dispersions) have been developed for such target end-uses, unfortunately, as noted above, they have also exhibited certain limitations. Improvements to such technology, such as a new polymeric liquid blue colorant based on anthranquinone that provides effective colorations for such myriad end-uses as noted above and that exhibit excellent colorations, lightfastness, thermal stability, base stability, compatibility with other coloring agents, and low toxicity, at least, is thus highly desired. Again, to date, there have been no teachings or fair suggestions of such a highly desirable, specific potentially polymeric liquid blue colorant within the pertinent prior art or within the colorant industry itself.

DESCRIPTION OF THE INVENTION

It has thus now been determined that poly(oxyalkylene) chains attached, through an aromatic amino group (or groups), to the 1-position, the 4-position, or both positions, of an anthraquinone backbone provides such a needed and highly desired liquid blue colorant, particularly for utilization within thermoplastic and thermoset applications. It is thus an object of the invention to provide such a colorant exhibiting (at least) excellent colorations, low extraction, amine/base stability, thermal stability, and lightfastness within target thermoplastic and/or thermoset articles. Another object of this invention is to provide a blue polymeric colorant having at least one poly(oxyalkylene) chain attached thereto, wherein said polymeric colorant can be tailored for ease of processing, ease of mixing within target plastic media, and provides excellent colorations within the target finished articles. Yet another object of this invention is to provide excellent colorations within liquid compositions (such as inks, and the like) through the utilization of such water-soluble, blue liquid aromatic amino anthraquinone-based polymeric colorants, as noted above.

It is to be understood that the term alkyl as used throughout is intended to encompass any straight or branched alkyl moiety, having anywhere from 1 to 30 carbons therein; the same chain length applies to the term "alkoxy" as well. Also, the terms substituted phenyl and substituted polyphenyl are intended to encompass any phenyl system having any type of pendant group attached thereto, including, without limitation, alkyl groups, alkylene groups, alcohol groups, ether groups, ester groups, amine groups, amide groups, hydroxyls, and the like. Phenyl is basically an unsubstituted ring system (and thus includes hydrogens only).

The present invention preferably encompasses colorants conforming to the structure of Formula (I)

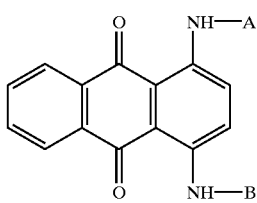

(I)

wherein A is selected from the group consisting of hydrogen, $C_1$–$C_8$ alkyl, $C_1$–$C_8$ alkoxy, and the structure of Formula (II)

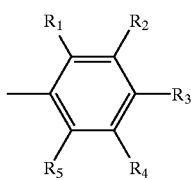

(II)

and B is selected from the group consisting of hydrogene, $C_1$–$C_8$ alkyl, $C_1$–$C_8$ alkoxy, and the structure of Formula (III)

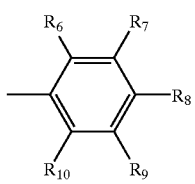

(III)

and wherein at least one of A and B is the structure of Formulas (II) or (III); wherein $R_1$, $R_2$, $R_3$, $R_4$, $R_5$, $R_6$, $R_7$, $R_8$, $R_9$, and $R_{10}$ are the same or different and are selected from the group consisting of hydrogen, $C_1$–$C_{20}$ alkyl, $C_1$–$C_{20}$ alkoxy, and Q—E, wherein Q is selected from the group consisting of N, O, S, $SO_2$, $SO_3$, $CO_2$, $SO_2$ N, alkyl, and alkoxy, and E conforms to the structure of Formula (IV)

[polyoxyalkylene constituent]$_z$R'     (IV)

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof; and R' is selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ $C_{1-20}$ alkylsufonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, $R_5$, $R_6$, $R_7$, $R_8$, $R_9$, and $R_{10}$ is Q—E. Preferably, Q is O, E is a combination of ethylene oxide and propylene oxide, and z is 1.

More specifically, and preferably, the inventive blue anthraquinone colorant conforms to the structure of (V)

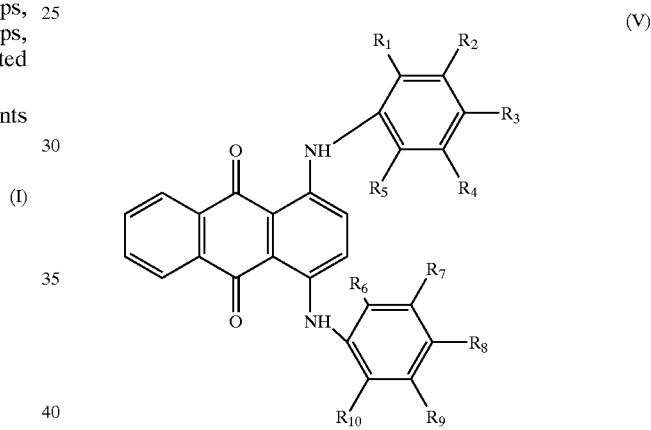

(V)

wherein $R_1$, $R_2$, $R_3$, $R_4$, $R_5$, $R_6$, $R_7$, $R_8$, $R_9$, and $R_{10}$ are the same or different and are selected from the group consisting of $C_{1-20}$ alkyl, halo, hydroxyl, hydrogen, cyano, sulfonyl, sulfo, sulfato, aryl, nitro, carboxyl, $C_{1-20}$ alkoxy, and Q—E, wherein at least one of $R_1$, $R_2$, $R_3$, $R_4$, and $R_5$ is Q—E, and/or at least one of $R_6$, $R_7$, $R_8$, $R_9$, or $R_{10}$ is Q—E, wherein Q is selected from the group consisting of N, O, S, $SO_2$, $SO_3$, $CO_2$, and E is represented by the Formula (VI)

[polyoxyalkylene constituent]$_z$R'     (VI)

wherein polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof, and R' is selected from the group consisting of hydrogen, $C_{1-20}$ alkoxy, $C_{1-20}$ alkyl, and $C_{1-20}$ esters.

Compositions comprising such compounds conforming to the broad structure of Formulae (I) and (V) are also encompassed within this invention, particularly those comprising such compounds and other coloring agents and other additives such as antioxidants, UV absorbers, flame retardants, light stabilizers, nucleating and/or clarifying agents, and the like, as liquids or as pellets for further introduction within desired molten thermoplastic formulations; and those compositions comprising such compounds and other coloring agents and other additives such as antioxidants, UV absorbers, flame retardants, light stabilizers, catalysts, surfactants, blowing agents, and the like, to effectuate the formation of thermosets such as polyurethane foams. Methods of making such compositions, particularly thermoplastics, such as PET and polypropylene, and thermosets such as polyurethane foam, comprising such compounds of Formulae (I) and (V), above, are also contemplated within this invention.

The term "thermoplastic" is intended to encompass any synthetic polymeric material that exhibits a modification in physical state from solid to liquid upon exposure to sufficiently high temperatures. Most notable of the preferred thermoplastic types of materials are polyolefins (i.e., polypropylene, polyethylene, and the like), polyester (i.e., polyethylene terephthalate, and the like), polyamides (i.e., nylon-1,1, nylon-1,2, nylon-6 or nylon-6,6), polystyrenes, polyurethanes, polycarbonates, polyvinyl halides (i.e., polyvinyl chloride and polyvinvyl difluoride, as merely examples), and the like. Preferred thermoplastics within this invention are polyesters, and most preferred is polyethylene terephthalate.

Such thermoplastic articles include bottles, storage containers, sheets, films, fibers, plaques, hoses, tubes, syringes, and the like. Included within this list would be polyester, polystyrene and other like resinous materials in sheet form which are present within windows for strength and resiliency functions. In such an instance, the inventive colorant compounds would provide or contribute to excellent colorations to such thermoplastic articles for decorative, aesthetic, and/or protective (such as ultraviolet or infrared protection) purposes. Basically, the possible uses for such a low-migratory, thermally stable colorant for such items as thermoplastics (particularly polyesters such as transparent polyethylene terephthalate) is voluminous and cannot easily be enveloped. Other possible end-uses, however, would include within solvent systems, printing inks, within and on textiles (either on or within textiles, fibers, or fabrics) and the like.

Other types of articles contemplated within this invention for the inventive colorant compounds include, again without limitation, thermoplastic articles, such as films, sheets, bottles, containers, vials, and the like. Other colorants may be added to or incorporated therein with such inventive colorant compounds to produce different hues and tints, again for aesthetic, decorative, and/or protective purposes. Ultraviolet absorbers may also be introduced, incorporated, and the like, in order to protect the article or, if in container for, the contents therein. In concert with such an inventive colorant, or combinations of colorants with such an inventive colorant, such UV absorber or absorbers may be added in reduced amounts to provide the desired UV protection level, potentially, due to the inherent protective abilities of the colorant or combination thereof in terms of reducing. ultraviolet transmissions (or inversely increasing ultraviolet absorption). Thus, such inventive colorants permit cost reductions (by avoiding the cost of larger amounts of expensive UV absorbers) without sacrificing UV protection.

Such thermoplastic colorants (and other additives) are typically added to such compositions during the injection molding (or other type of molding, such as blow molding), thereof, including, and without limitation, by mixing the inventive liquid colorant with resin pellets and melting the entire coated pellets, or through a masterbatch melting step while the resin and the inventive colorant are pre-mixed and incorporated together in pellet form. Such plastics include, again without limitation, polyolefins, polyesters, polyamides, polyurethanes, polycarbonates, and other well known resins, such as those disclosed within U.S. Pat. No. 4,640,690, to Baumgartner et al., and U.S. Pat. No. 4,507,407, to Kluger et al. under the term "thermoplastics". Generally, such plastics, including the inventive liquid polymeric colorant, UV absorber, and other potential additives, are formed through any number of various extrusion, etc., techniques, such as those disclosed in the aforementioned U.S. patents. Preferred thermoplastics are polyesters, such as, in one non-limiting embodiment, polyethylene terephthalate. "Plastic packaging" thus encompasses containers, sheets, blister packages, and the like, utilized for storage purposes and which include the plastics in any combination as noted above. In addition, these aforementioned U.S. patents also provide the same definition and scope of term "thermosets" as for the inventive coloring applications.

The term "pure, undiluted state" as used in conjunction with the inventive colorant compounds indicates that the compounds themselves without any additives are liquid at room temperature or which thus encompasses all types that exhibit viscosities of at most 100,000 cps at room temperature or meet such viscosity limits upon exposure to temperatures of at most about 40° C. and which remain within said low viscosity range thereafter for at least 24 hours upon cooling to room temperature. Thus, there is no need to add solvents, viscosity modifiers, and other like additives to the compounds to effectuate such a desirable physical state.

The presence of surfactants, solvents, and the like, may be utilized to alter the solubility, coloring characteristics, and the like, of the ultimate inventive polymeric anthraquinone colorant which would be understood and appreciated by the ordinarily skilled artisan within this particular art.

The colorant compounds of Formulae (I) and (V), above, are, again, liquid in their pure, undiluted state; however, pasty or waxy colorants are also encompassed within this invention, due to their handling improvement over clearly solid colorants of similar structures. In order to effectuate coloring of substrates and media, any other standard colorant additives, such as resins, preservatives, surfactants, solvents, antioxidants, flame retardants, antistatic compounds, antimicrobial agents, and the like, may also be utilized within the inventive colorant compound compositions or methods.

DESCRIPTION OF THE PREFERRED EMBODIMENT

The specific formulations below, as well as the following exemplified methods of producing such and methods of coloring using such are thus indicative of the preferred embodiments of this invention:

Synthesis of Intermediates

EXAMPLE 1

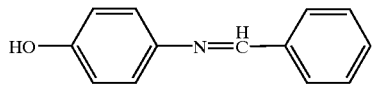

Ethanol (200 proof, 515 g) and p-aminophenol (300 g, 2.75 mol) were charged into a 2 L 3-neck round bottom flask equipped with a thermometer and a condenser. Benzaldehyde (292 g, 2.75 mol) was added from an additional funnel while maintaining a slow and steady flow and while stirring. Another portion of ethanol (150 g) was added and the whole mixture was heated to reflux for 1.5 h. After cooling down to room temperature, the solid thus formed was collected by filtration and washed three times with ethanol (3×50 ml) and dried. 492 g (91%) of imine product was obtained as a pale yellow powder.

EXAMPLE 2

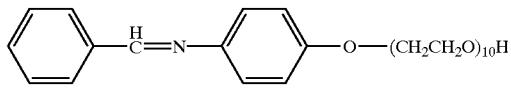

The imine product (285 g, 1.44 mol, from Example 1) was reacted with 634 g of ethylene oxide in 200 ml of toluene, according to the procedures described in U.S. Pat. Nos. 5,082,938 and 5,591,833, to yield 910 g (98.2%) of pale brown yellow liquid product.

EXAMPLE 3

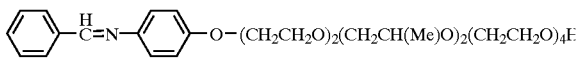

The imine product (1182 g, 6 mol, from Example 1) was reacted, according to the procedures described in U.S. Pat. Nos. 5,082,938 and 5,591,833, with ethylene oxide (528 g, 12 mol), propylene oxide (696 g, 12 mol), and ethylene oxide (1056 g, 24 mol), respectively, in 1400 ml of toluene to yield 3360 g (97%) of the product depicted above as a pale brown yellow liquid.

EXAMPLE 4

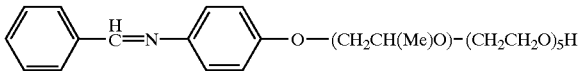

The imine product (250 g, from Example 1) was reacted in toluene (300 ml), *according to the procedures described in U.S. Pat. Nos. 5,082,938 and 5,591,833, with propylene oxide (74 g) and then with ethylene oxide (280 g) to yield 600 g (99%) of the product depicted above as a pale brown yellow liquid.

EXAMPLE 5

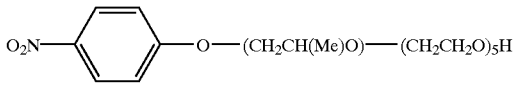

4-Nitrophenol (208 g) was reacted in toluene (300 ml), according to the procedures described in U.S. Pat. No. 5,135,972, with propylene oxide (87 g) and then with ethylene oxide (330 g) to yield 585 g of the nitrophenol product depicted above as a pale yellow liquid.

EXAMPLE 6

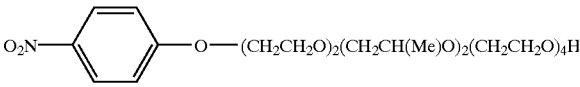

4-Nitrophenol (556 g, 4 mol) was allowed to reacted in toluene (750 g), according to the procedures described in U.S. Pat. No. 5,135,972, with ethylene oxide (352 g, 8 mol), propylene oxide (464 g, 8 mol) and ethylene oxide (704 g, 16 mol), respectively, to generate 2034 g (98%) of the nitrophenol product depicted above as a pale yellow liquid.

EXAMPLE 7

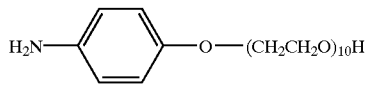

The imine product of Example 2 (340 g, 0.27 mol) was hydrolyzed in the presence of water (150 ml) and hydrochloric acid (56 g) to generate 285 g (97%) of the alkoxylated aniline product depicted above as a light brownish yellow liquid.

EXAMPLE 8

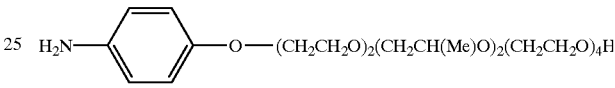

Alternative methods of forming such an intermediate have been followed, such as the following:

Method 1: The imine product of Example 3 (600 g) was hydrolyzed in the presence of water (220 g) and concentrated hydrochloric acid (45 g) or sulfuric acid (15 g) to result in 493 g of the aniline product depicted above as a light brownish yellow liquid.

Method 2: The nitrophenol product of Example 6 (913 g) was hydrogenated in the presence of Pd/C (5%, 10 g) in methanol, according to the procedures described in U.S. Pat. Nos. 5,135,972 and 5,082,938, to yield 804 g of the aniline product depicted above as a pale yellow liquid.

EXAMPLE 9

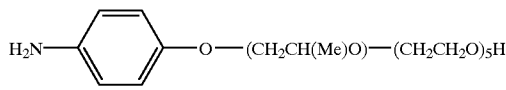

Alternative methods also exist for the production of this intermediate, as follows:

Method 1: The nitrophenol product of Example 5 (180 g) was hydrogenated in the presence of Pd/C (5%, 3 g) in ethanol, according to the procedures described in U.S. Pat. Nos. 5,135,972 and 5,082,938, to yield 150 g of the aniline product depicted above as a pale yellow liquid.

Method 2: The imine product of Example 4 (738 g) was hydrolyzed in the presence of water (365 ml) and concentrated hydrochloric acid (73 g) to result in 595 g of the aniline product depicted above as a light brownish yellow liquid.

EXAMPLE 10

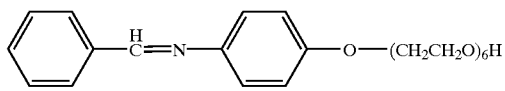

The imine product from Example 1 (250 g) was reacted in toluene (300 ml), according to the procedures described in U.S. Pat. Nos. 5,082,938 and 5,591,833, with eylene oxide (335 g) to yield 575 g (98%) of the imine product depicted above as a pale brown yellow liquid.

EXAMPLE 11

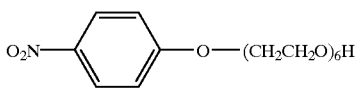

4-Nitrophenol (208 g) was allowed to react in toluene (300 ml), according to the procedures described in U.S. Pat. Nos. 5,082,938 and 5,135,972, with ethylene oxide (395 g) to obtain 595 g of the ethoxylated nitrophenol product depicted above as a pale yellow liquid.

EXAMPLE 12

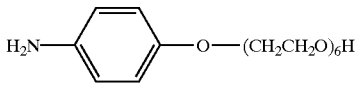

Alternative methods of producing this intermediate also exist as follows:

Method 1: The ethoxylated nitrophenol of Example 11 (180 g) was hydrogenated in ethanol (150 ml) in the presence of Pd/C (5%, 3 g), according to the procedures described in U.S. Pat. Nos. 5,082,938 and 5,135,972, to obtain 155 g of product the ethoxylated aniline product depicted above as a pale yellow liquid.

Method 2: The ethoxylated imine product of Example 10 (738 g) was hydrolyzed, according to the procedures described in U.S. Pat. Nos. 5,082,938 and 5,591,833, in the presence of water (365 ml) and concentrated hydrochloric acid (73 g) to obtain 530 g of the ethoxylated aniline product depicted above as a light brownish yellow liquid.

EXAMPLE 13

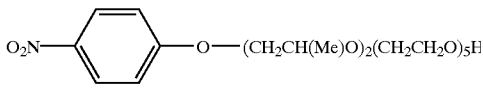

4-Nitrophenol (208 g) was reacted in toluene (300 ml), according to the procedures described in U.S. Pat. Nos. 5,082,938 and 5,135,972, with propylene oxide (174 g) and then with ethylene oxide (330 g) to yield 647 g of the nitrophenol product depicted above as a pale yellow liquid.

EXAMPLE 14

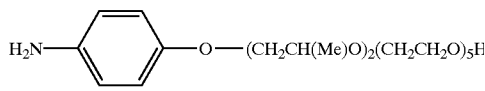

The nitrophenol product of Example 13 (800 g) was hydrogenated in the presence of methanol (600 ml) and Pd/C (5%, 8 g), according to the procedures described in U.S. Pat. Nos. 5,082,938 and 5,135,972, to obtain 700 g of the alkoxylated aniline product as a pale yellow liquid.

Synthesis of Inventive Polymeric Arylamino Anthraquinone Blue Colorants

EXAMPLE 15

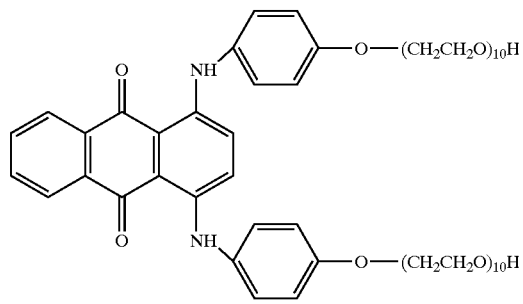

To a 500-ml 3-neck round-bottom flask equipped with a mechanical stirrer, a thermal controller and a reflux condenser, were charged 26.4 g of quinizarin, 9 g of leucoquinizarin, 12 g of boric acid and 60 g of water. After stirred for 10 min under nitrogen gas, the mixture was then charged with 170 g of the alkoxylated aniline product of Example 7. The whole formulation was then heated to 120° C. with a nitrogen gas sweep and the reaction was monitored by UV-vis. After 8 hours of heating, the reaction was complete (UV-vis in MeOH, Abs. $\lambda_{632\,nm}/\lambda_{600\,nm}$>1.03). The reaction mixture was neutralized to pH 6–7 by caustic. Upon removal of water by vacuum stripping, 200 g of the desired product (depicted by the formula above) was obtained as a viscous blue liquid with a color-strength of 8.8 abs./g/L (MeOH) and the maximum absorbency at 632 nm.

EXAMPLE 16

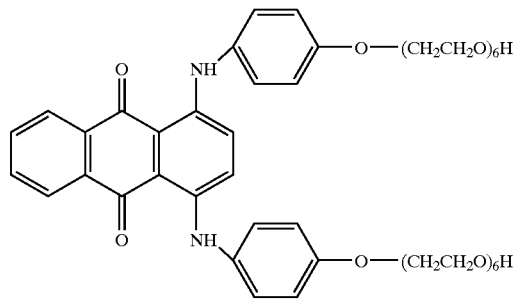

To a 500-ml 3-neck round-bottom flask equipped with a mechanical stirrer, a thermal controller and a reflux condenser, were charged 26.4 g of quinizarin, 9 g of leucoquinizarin, 12 g of boric acid and 60 g of water. After stirred for 10 min under N2, the mixture was then charged 125 g of the alkoxylated aniline product of Example 12. The whole formulation was then heated to 120° C. with a nitrogen gas sweep and the reaction was monitored by UV-vis. After 8 hours of heating, the reaction was complete (UV-vis in MeOH, Abs.$\lambda_{632\ nm}/\lambda_{600\ nm}$>1.03). The resultant formulation was then neutralized to pH 6–7 by the addition of 100 mL of water and caustic. Upon removal of water by vacuum stripping, 150 g of the desired product (depicted by the formula above) was obtained as a viscous blue liquid with a color-strength of 12 abs./g/L (MeOH) and the maximum absorbency at 632 nm.

charged with 70 g of the ethoxylated aniline product of Example 14. The whole formulation was heated to 100° C. with a nitrogen gas sweep and the reaction was monitored by UV-vis. After 20 hours of heating, the reaction was complete (UV-vis in MeOH, Abs. $\lambda_{632\ nm}/\lambda_{600\ nm}$>1.03). After the addition of 100 ml water, the mixture was poured into a separation funnel, and the organic layer was collected. Upon removal of water by vacuum stripping, 55 g of the desired product (depicted by the formula above) was obtained as a viscous blue liquid with a color-strength of 11.8 abs./g/L (MeOH) and the maximum absorbency at 632 nm.

EXAMPLE 17

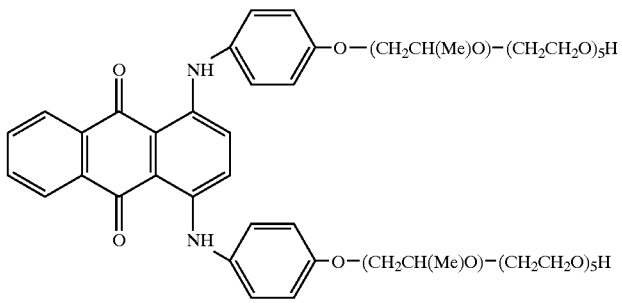

To a 250-ml 3-neck round-bottom flask equipped with a mechanical stirrer, a thermal controller and a reflux condenser, were charged 13.2 g of quinizarin, 4.5 g of leucoquinizarin, and 6 g of boric acid. After stirring for 10 min under nitrogen gas, the mixture was then charged 60 g of the ethoxylated aniline product of Example 9. The whole formulation was heated to 130° C. with a nitrogen gas sweep and the reaction was monitored by UV-vis. After 5 hours of heating, the reaction was complete (UV-vis in MeOH, Abs. $\lambda_{632\ nm}/\lambda_{600\ nm}$>1.03). After the addition of 100 ml water and neutralization to pH 6–7 by caustic, the mixture was poured into a separation funnel, and the organic layer was collected. Upon removal of water by vacuum stripping, 60 g of the desired product (depicted in the formula above) was obtained as a viscous blue liquid with a color-strength of 12.8 abs./g/L (MeOH) and the maximum absorbency at 634 nm.

EXAMPLE 18

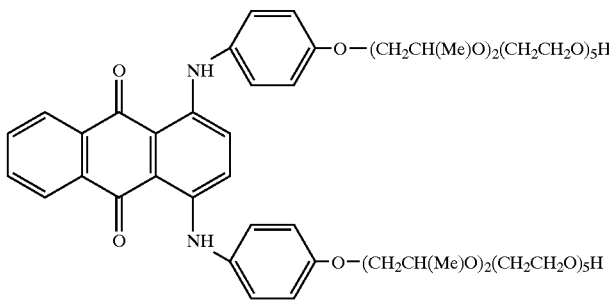

To a 250-ml 3-neck round-bottom flask equipped with a mechanical stirrer, a thermal controller and a reflux condenser, were charged 13.2 g of quinizarin, 4.5 g of leucoquinizarin, 30 g of water and 6 g of boric acid. After stirring for 10 min under nitrogen gas, the mixture was then

EXAMPLE 19

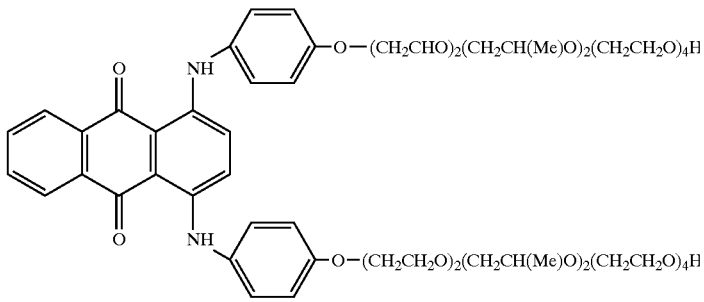

Alternative methods of producing such a colorant exist as follows:

Method 1: To a 250-ml 3-neck round-bottom flask equipped with a mechanical stirrer, a thermal controller and a reflux condenser, were charged 10.6 g (44 mmol) of quinizarin, 3.6 g (15.2 mmol) of leucoquinizarin, 24 g of water and 4.8 g (78 mmol, 1.3 eq) of boric acid. After stirring for 10 min under nitrogen gas, the mixture was then charged 64 g (2.2 eq) of the ethoxylated aniline product of Example 8. The whole formulation was heated to 120° C. with a nitrogen gas sweep and the reaction was monitored by UV-vis. After 9 hours of heating, the reaction was complete (UV-vis in MeOH, Abs. $\lambda_{632\ nm}/\lambda_{600\ nm}$>1.03). After the addition of 80 ml water and neutralization to pH 7–8, the mixture was poured into a separation funnel to settle, and the organic layer was collected. Upon removal of water by vacuum stripping, 46 g of the desired product (depicted by the formula above) was obtained as a viscous blue liquid with a color-strength of 12.5 abs./g/L (MeOH) and the maximum absorbency at 631 nm.

Method 2: To a 500-ml 3-neck round-bottom flask equipped with a mechanical stirrer, a thermal controller and a reflux condenser, were charged 26.4 g (110 mmol) of quinizarin, 9 g (38 mmol) of leucoquinizarin, 60 g of water and 12 g (200 mmol, 1.3 eq) of boric acid. After stirred for 10 min under nitrogen, the mixture was then charged 172 g of the ethoxylated aniline product of Example 8. The whole formulation was heated to 120° C. with a nitrogen gas sweep and the reaction was monitored by UV-vis. After 5 hours of heating, the reaction was complete (UV-vis in MeOH, Abs. $\lambda_{632\ nm}/\lambda_{600\ nm}$>1.03). After the addition of 100 ml water and neutralized to pH 7–8, the mixture was poured into a separation funnel to settle, and the organic layer was collected. The organic layer was then washed 3 times with 130 ml of 20% aqueous ammonia solution. Upon removal of water from the organic layer by vacuum stripping, 172 g of the desired product was obtained as a viscous blue liquid with a color-strength of 10.8 abs./g/L (MeOH) and the maximum absorbency at 631 nm.

Method 3: To a 2000-ml 3-neck round-bottom flask equipped with a mechanical stirrer, a thermal controller and a reflux condenser, were charged 105.6 g of quinizarin, 36 g of leucoquinizarin, 240 g of water and 48 g of boric acid. After stirred for 10 min under nitrogen gas, the mixture was then charged with 752 g of the ethoxylated aniline product of Example 8. The whole formulation was then heated to 120° C. with a nitrogen gas sweep and the reaction was monitored by UV-vis. After 16 hours of heating, the reaction was complete (UV-vis in MeOH, Abs. $\lambda_{632\ nm}/\lambda_{600\ nm}$>1.03). The mixture was cooled to room temperature and washed 3 times with 600 ml of 3% $H_2SO_4$ solution and 1 time with 600 ml of 20% aqueous ammonia solution. Upon removal of water from the organic layer by vacuum stripping, 600 g of the desired product was obtained as a viscous blue liquid with a color-strength of 11.3 abs./g/L (MeOH) and the maximum absorbency at 630 nm.

Method 4: To a 250-ml 3-neck round-bottom flask equipped with a mechanical stirrer, a thermal controller and a reflux condenser, were charged 9 g (37.4 mmol) of quinizarin, 9 g (38 mmol) of leucoquinizarin and 20 g of water. After stirring for 10 min under a nitrogen gas purge, the mixture was then charged 160 g of the ethoxylated aniline product of Example 8 and 12 g (0.2 mol) of boric acid. The whole formulation was then heated to 120° C. with a nitrogen gas sweep. In the meantime, 17.5 g (72.4 mmol) of quinizarin was mixed together to make slurry. After 3 hours of heating at 120° C., portions of 14 g of quinizarin/water slurry was charged into above reaction mixture every hour until it finished. After the last addition, the reaction mixture was continued heating for 3 more hours until the reaction was complete (UV-vis in MeOH, Abs. $\lambda_{632\ nm}/\lambda_{600\ nm}$>1.03). The mixture was cooled to room temperature and washed 3 times with 130 ml of 20% aqueous ammonia solution and the organic layer was collected. Upon removal of water from the organic layer by vacuum stripping, 160 g of the desired product was obtained as a viscous blue liquid with a color-strength of 10.1 abs./g/L (MeOH) and the maximum absorbency at 632 nm.

Synthesis of Comparative Anthraquinone Blue Dye

EXAMPLE 20

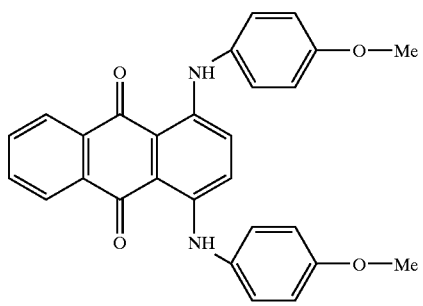

To a 250-ml 3-neck round-bottom flask equipped with a mechanical stirrer, a thermal controller and a reflux condenser, were charged 22 g (91.6 mmol) of quinizarin, 11 g (45.4 mmol) of leucoquinizarin and 120 ml of chlorobenzene. The mixture was stirred and purged with nitrogen for 5 min, and then were slowly charged 85 g (0.69 mol, 5 eq) of para-anisidine and 3.5 g (56 mmol) of boric acid. The whole was heated to 135–140° C. for 18 hours under nitrogen gas. Subsequently, the nitrogen gas protection was removed, and 12 g of nitrobenzene was introduced at 135° C. After stirring for 1 hour at 135° C., the reaction was cooled down to 70° C. and 8 g of iso-propanol was added while stirring. The solid formed was collected by filtration at 70° C., and washed with 50 ml of iso-propanol, water and then iso-propanol again, After re-crystallization from EtOH/DMF (2:1) and drying at 70° C. within an oven, 35 g of dark blue solid product was obtained with the maximum absorbency at 633 nm (acetone).

Applications of Inventive Arylamino Anthraquinone Blue Colorants in Plastics a) Thermoplastic Composition Formation in PET In each instance noted below regarding PET application, the inventive polymeric liquid blue colorant was introduced within an injection molding operation for a polyester thermoplastic, in this instance polyethylene terephthalate (ClearTuf® 8006 PET resin from Shell). The inventive liquid colorant, in the amount noted in related examples, was blended via agitation onto the hot, dried polyethylene terephthalate resin (in pellet form). The blend of colorant and pellets was gravity fed into the feed throat of the machine. In the feed section, melting was accomplished through the utilization of a heated (heat transferred from the barrel of the machine) screw extruder which rotated. The rotation of the screw provided thorough mixing of the colorant and molten resin together producing a uniform plastic melt which was injected into a mold in order to form the thermoplastic article, for instance a 2 inch by 3 inch plaque with a uniform thickness of 50 mils and a surface area of 12.5 in$^2$.

EXAMPLES 21 AND 22

This method was followed for the production of polypropylene plaques comprising inventive colorants of Examples 17 and 19, above, respectively, and provided a pleasing blue shade with no visible color differences, bubbles, streaks, or other deleterious effects in sample plaques.

EXAMPLE 23

(Comparative)

As a comparative example for the extraction test, below, the same thermoplastic production method was followed for the AQ Blue dye of Example 20, above, and provided a pleasing blue shade.

b) Thermoplastic Composition Formation in Polyolefin

The inventive colorant was introduced within an injection molding operation for a polyolefin thermoplastic, for instance polypropylene comprising Fina 7525 MZ random copolymer polypropylene. The liquid colorant, in an amount of 1,000 ppm of the total amount of the resin, was blended via agitation onto the resin (in pellet form). The blend of colorant and pellets was gravity-fed into the feed throat of the machine. In the feed section, melting was accomplished through the utilization of a heated (heat transferred from the barrel of the machine) screw extruder which rotated. The rotation of the screw provided thorough mixing of the colorant and molten resin together producing a uniform plastic melt which was injected into a mold in order to form the thermoplastic article, for instance a 2 inch by 3 inch plaque with a uniform thickness of 50 mils and a surface area of 12.5 in$^2$.

EXAMPLE 24

This method was followed for the production of polypropylene plaques comprising inventive colorant of Example 19, above, and provided a pleasing blue shade with no visible color differences, bubbles, streaks, or other deleterious effects in sample plaques.

EXAMPLE 25

(Comparative)

As a comparative example for the extraction test, below, the same thermoplastic production method was followed for the AQ Blue dye of Example 20, above, and provided a pleasing blue shade.

c) Polyurethane Foam Compositions (i) Polyether Foam—Inventive blue colorants was incorporated with the following composition and in accordance with the following formulation and procedure:

| Component | Amount |
| --- | --- |
| Arcol ® F3020 Polyol (from Aroco Chemical) | 100 grams |
| Water | 4.53 mL |
| DABCO TL (catalyst, from Air Products) | 0.15 mL |
| DABCO T10 (catalyst) | 0.32 mL |
| L520 Silicone (Union Carbide) | 1.0 mL |
| 80/20 Toluene diisocyanate (Bayer) (112 index) | 49.0 |
| Inventive Blue colorant | as noted |

Upon mixture within a reaction vessel, the reaction created a "health" bubble, and the vessel was then exposed to 185° C. for about 10 min to form a blue foam. The resultant foam bun was then analyzed for performance, as discussed in detail below. Blue foams were also made with 2 php of the inventive colorant of EXAMPLE 15 and 4 php of the inventive colorant of EXAMPLE 19, both samples rendering the same standard and desirable foam performance as exhibited by the above foam article compared with a control (a foam made with above formulation without the addition of any colorant).

EXAMPLES 26 AND 27

Blue foams were made with 2 php and 4 php of the inventive blue colorants from Example 15 and Example 19, respectively, and exhibited good resiliency and densities measured at about 1.5 pounds per cubic foot.

(ii) Polyester Foam—Inventive blue colorants were incorporated with the following composition and in accordance with the following formulation and procedure:

| Component | Amount |
| --- | --- |
| Fomrez ® 76 (from Witco) | 100 grams |
| Water | 3.60 mL |
| DABCO B-16 (catalyst, from Air Products) | 0.17 mL |
| L532 Silicone (Union Carbide) | 1.0 mL |
| n-Ethylmorpholine (catalyst, from Aldrich) | 2.30 mL |
| 80/20 Toluene diisocyanate (Bayer) (112 index) | 37.0 |
| Inventive Blue colorant | as noted |

Upon mixture within a reaction vessel, the reaction created a "health" bubble, and the vessel was then exposed to 160° C. for about 10 min to form a blue polyester foam. The resultant foam bun was then analyzed for performance, as discussed in detail below (blue foams were also made with 2 php of the inventive colorant of EXAMPLE 15 and 4 php of the inventive colorant of EXAMPLE 19, both samples rendering the same standard and desirable foam resiliency and density as exhibited by the above foam article).

EXAMPLES 28 AND 29

Blue polyester foams were made with 2 php and 4 php of the inventive blue colorants from Example 15 and Example 19, respectively, and exhibited good resiliency and densities measured at about 2.0 pounds per cubic foot.

Performance Testing of Inventive Arylamino AQ Blue Colorants a) Lightfastness Testing of the Thermoplastic PET Composition Ten plaques made according to Example 21 (which contained 100 ppm of the inventive colorant of Example 17) were collected from the standard injection molding operation.

The color of the ten plaques collected from the standard operation was measured in both reflectance and transmittance on a Gretag-Macbeth Color-Eye 7000A Spectrophotometer and averaged together to represent the standard. Three sets of 2 plaques were then placed under xenon light for 10, 20 and 40 hours exposure, respectively. Each set of the 2 plaques was collected after the designed hours of exposure and were measured individually and sequentially on the spectrophotometer. The color difference between the standard and the each of the 3 sets of plaques was determined by the $\Delta E_{cmc}$. The bigger the $\Delta E_{cmc}$ of the plaques, the larger the color difference and is determined to be worse the colorant's lightfastness.

TABLE 1

Lightfastness of the Inventive Color Composition

| Colorant Composition | Exposure Time (h) | Loading | $\Delta E_{cmc}$ |
|---|---|---|---|
| From Example 17 | 10 | 100 ppm | 0.456 |
| From Example 17 | 20 | 100 ppm | 0.686 |
| From Example 17 | 40 | 100 ppm | 1.360 |

Under this protocol, an $\Delta E_{cmc}$ of at most 2 is highly desired.

b) Thermoplastic Composition Formation for Intrinsic Visosity Testing

The inventive colorant of Example 19 was introduced within a mixing operation for a polyester thermoplastic, for instance polyethylene terephthalate. The mixing was accomplished by the use of a C. W. Brabender Electronic Plasti-Corder®, model number EPL-V5501, torque rheometer with a Type Six 2-piece mixer attachment. Cam style removable blades were used in the mixer attachment providing a medium shear-rate mixing. The temperature of the mixing chamber was set to 285° C. and controlled via electric heating and air cooling.

The liquid colorant was weighed into a small disposable syringe. The loading of the liquid colorant was adjusted based on the strength of the colorant. The hot, dried polyethylene terephthalate resin, specifically M & G ClearTuf® 8006, in pellet form, was quickly weighed into a glass jar and sealed to minimize the adsorption of moisture by the resin. The torque rheometer mixing blades were turned on and set to a speed of 25 rpm as indicated by the digital display. A 25 ft³/h flow of dried nitrogen gas was introduced into the mixing chamber through the loading ram.

The dried polyethylene terephthalate resin was poured into the mixing chamber and the loading ram was closed while the nitrogen gas continued to flow into the chamber. Simultaneously, a stopwatch was started to mark the beginning of the operation. After 1 minute and 30 seconds of mixing, the loading ram was raised and the liquid colorant was dispensed into the molten polyester resin. The loading ram was lowered and the liquid colorant was allowed to mix with the molten polyester resin for an additional 1 minute and 30 seconds.

After such time, the blades were stopped and the loading ram was raised. The blades were reversed and a metal spatula was used to remove a sample of the molten, colored polyester from the mixing chamber. This molten sample was immediately compressed between two metal plates and allowed to cool to form the final thermoplastic disk.

The intrinsic viscosity of the colored thermoplastic disk was measured according to ASTM D4603. The intrinsic viscosity of the colored thermoplastic disk was compared to the intrinsic viscosity of an uncolored thermoplastic control disk. The uncolored thermoplastic control disk was processed in the same manner as described above but without the addition of the liquid colorant. The reduction in the intrinsic viscosity of the colored thermoplastic disk can be expressed using the following equation:

$$IV\,LOSS_{COLOR} = IV_{UNCOLORED\,CONTROL} - IV_{COLORED\,DISK}$$

As a comparison, molded plaques containing pure ClearTint® Cyan 486 (having a color value of 70 and commercially available from Milliken Chemical) were produced according to the same procedure. The color loading of the inventive colorant Example 19 was adjusted using the strength factor so the depth of shade was comparable to the ClearTint® Cyan 486. For example, 1983 ppm of colorant from Example 19 in PET has equivalent depth of shade to 5358 ppm of Cyan 486 in PET. The intrinsic viscosity results and comparisons are summarized in the following table:

TABLE 2

Intrinsic Viscosity Loss in PET

| Sample (from Example #) | Color Loading (ppm) | Avg. IV | Control IV | IV Loss |
|---|---|---|---|---|
| Control | — | 0.770 | — | — |
| Example 19 | 1983 | 0.768 | 0.775 | 0.007 |
| Example 19 | 2143 | 0.757 | 0.775 | 0.018 |
| Example 19 | 3164 | 0.750 | 0.775 | 0.025 |
| Cyan 486 | 5358 | 0.726 | 0.775 | 0.049 |
| Cyan 486 | 972 | 0.747 | 0.781 | 0.034 |

Thus, the inventive colorants exhibit significant improvements in IV loss in PET articles compared with existing commercial product.

c) Thermal Stability Test of Inventive Blue in PET

Thermoplastic plaques of polyester terephthalate were produced as (injection molded). A total of ten plaques were then collected from the standard injection molding operation. The same injection molding machine used to produce these first ten plaques was then was paused during production of ten further plaques and allowed to remain idle for 15 minutes at the standard polyester processing temperatures (~277° C.). At the end of the 15-minute pause, the machine was then restarted without purging the colored resin from the heated barrel of the machine. Ten consecutive plaques were then collected and numbered after resumption of the injection molding operation.

The color of the ten plaques collected from the standard operation was measured in both reflectance and transmittance on a Gretag-Macbeth Color-Eye 7000A Spectrophotometer and averaged together to represent the standard. Each of the ten consecutive plaques collected after the 15-minute hold period were measured individually and sequentially on the spectrophotometer. The color difference between the standard and the each of the ten plaques was determined by the $\Delta E_{CMC}$. The maximum $\Delta E_{CMC}$ of the ten plaques collected after the 15-minute hold period represents the largest color difference and is determined to be the colorant's thermal stability. Inventive blue colorants from Example 15 and 19, above, were compared with ClearTint® Cyan 486 (CV 70), and the results are tabulated below (with the Example 19 color loading of 970 ppm and the other color loadings adjusted to the same depth of shade based on color strength):

TABLE 3

Thermal Stability Data in PET

| Colorant Composition | $\Delta E_{CMC}$ |
|---|---|
| From Example 19 | 1.5 |
| From Example 15 | 1.2 |
| ClearTint ® Cyan 486 | 9.9 |

An $\Delta E_{CMC}$ of less than 4 is considered to be excellent when analyzed by this protocol. Clearly, the inventive colorants exhibit highly favorable thermal stability characteristics.

d) Extraction Analyses for Inventive Colored PET Plaques

The plaques made above with the accordance with Examples 22 and 23 (Comparative) were tested for extraction of color under the following procedure (having a detection limit of 10 ppb) (hereinafter referred to as the "heated alcohol extraction test"):

Four plaques were cut in half and placed in a stainless steel extraction vessel. To the extraction vessel was added 125 g of 95% ethanol (preheated to 70° C.) was added. The vessels were sealed and then placed in a 70° C. oven for 2.5 hours. The vessels were then removed and allowed to cool to room temperature. In all cases, the plaques were separated with small glass slides and were completely immersed and exposed to the extraction solvent. This test was then duplicated for the same sample.

The extracts were then analyzed spectrophotometrically by UV-vis to determine the presence or absence of extracted colorant. A Beckman® DU 650 spectrophotometer with a 10.0 cm path length cell was used. The instrument was first zeroed using the extract obtained from the uncolored polyester plaques. The extract from the extraction of the plaques containing the various colorant additives was then scanned through the ultraviolet/visible range to determine the presence or absence of detectable peaks at the additives' lambda max. As noted above, the inventive blue colorant from Example 19 was compared with the comparative AQ blue dye from Example 20 at comparable loadings which resulted the same depth of shade. Uncolored PET plaques were extracted as control. The results are the average of 2 runs.

TABLE 4

Extraction data for Inventive Colored PET Resins

| Colorant Composition | Extraction Result |
|---|---|
| Control (Uncolored PET) | Not detectable |
| From Example 19, 1720 ppm | Not detectable |
| From Example 19, 2500 ppm | Not detectable |
| From Example 20 (Comparative), 1000 ppm | 0.1566 at 635 nm |

Thus, the inventive colorants provided highly improved extraction levels.

e) Extraction Analyses for Inventive Colored Polypropylene Plaques

The plaques made according to Examples 24 and 25 (Comparative) were tested for extraction of color under the heated alcohol extraction test:

One plaque was cut in half and placed in a stainless steel extraction vessel. To the extraction vessel was added 125 g of 95% ethanol (preheated to 70° C.) was added. The vessel were sealed and then placed in a 70° C. oven for 2.5 hours. The vessels were then removed and allowed to cool to room temperature. In all cases, the plaques were separated with small glass slides and were completely immersed and exposed to the extraction solvent. This test was then duplicated for the same sample.

The extracts were then analyzed spectrophotometrically by UV-vis to determine the presence or absence of extracted colorant. A Beckman® DU 650 spectrophotometer with a 10.0 cm path length cell was used. The instrument was first calibrated to zero using the extract obtained from the uncolored polypropylene plaques. The extract from the extraction of the plaques containing the various colorant additives was then scanned through the ultraviolet/visible range to determine the presence or absence of detectable peaks at the additives' lambda max. The inventive colorant from Example 19 was compared with the comparative AQ blue dye from Example 20, as noted above, at comparable loadings which resulting the same depth of shade. An uncolored PP plaque was tested as control. The results are the average of 2 runs.

TABLE 5

Extraction data for Inventive Colored PP Resins

| Colorant Composition | Extraction Result |
|---|---|
| Control (Uncolored PP) | Not detectable |
| From Example 19, 1720 ppm | 0.0017 |
| From Example 19, 2500 ppm | 0.0019 |
| From Example 20 (Comparative), 1000 ppm | 0.0244 |

An extraction level of 0.005 is considered to be acceptable in this application. Thus, the inventive colorants provided highly improved extraction levels.

f) Performance Characteristics of Polyurethane Foams Including the Inventive Blue Colorants The foams made in accordance with Examples 26, 27, 28, and 29 were all tested for standard foam performance, in terms of bun rise time, tack time, and bun height. As one example, the foam of Example 27 was compared with the same noncolored polyether foam. Measurements within 5% of the control are considered acceptable for the finished foam product. The measurements were as follows:

TABLE 6

Performance of Inventive Colored and Control Non-Colored Foams

| Example # | Rise Time (min) | Tack Time (min) | Bun Height (mm) |
|---|---|---|---|
| Example 27 | 1.73 | 3 | 235 |
| Control | 1.65 | 3 | 245 |

Thus, the inventive colorants provide acceptable polyurethane foam articles as compared with control samples.

g) Extraction Measurements From Polyurethane Foams

The colored foam from Example 27, above, was analyzed for extraction levels as a percentage of color extracted being equal to the absorbance level of the extract solution multiplied by 539.2 and then divided by the color value of the colorant itself. The extraction test involved cutting 1 gram of the cured foam from the center of the sample and post-curing the cut foam for another 20 minutes (at 160° C. in a glass jar). After cooling to room temperature, 75 grams of methanol were then added to the glass jar which was then capped for 1 hour. The foam was then removed and the extract liquor was analyzed under UV/Vis spectrophotometer for the maximum absorbtion. A percentage of less than 0.5% is considered acceptable. For the foam from Example 27, the measured absorption was measured to be 0.0370, and being well below the extraction level of 0.5, was therefore considered acceptable.

h) Base Stability of Inventive Colorants 0.1 g of Reactint® Blue X3LV, inventive blue colorants from Example 15 and 16 were dissolved in 100 ml of pH 12 aqueous buffer solutions, the color strength was measured by UV-vis at 0, 4, and 8 hours. After 8 hours, the UV-vis spectra suggested that the color strength of the solutions containing inventive blue colorants of Examples 15 and 16 did not have meaningful change, while the color strength of the solution containing Blue X3LV was lost more than 80%.

i) Amine Catalyst Stability of Inventive Colorants

Three standard 1.5 lb/ft3 density polyether foams containing 1 g of inventive blue colorants from Examples 18 or 19, or Reactint® Blue X3LV, respectively, were prepared according to the procedure described in Examples 26 and 27 (using 0.15 ml of the amine catalyst DABCO TL), immediately after the health bubble, the foams were placed in microwave for 10 min at 20% power and subsequently in a 160C oven for 3 min. The foams were then allowed to cool to ambient temperature and slice the bun vertically down the center and save the slices as the standard. The above processes were then repeated (still using the same amount of inventive blue colorants from Examples 18 or 19, or Reactint® Blue X3LV, respectively) by using 0.68 ml of amine catalyst DABCO TL. Both respected foam slices (standard vs. the one made with high amine catalyst) were then compared reading in CMC for ΔE. An ΔE of greater than 1.0 suggests that the color loss has taken place and the respected colorant is not high amine catalyst stable. According to the above procedures, no color loss was observed for the inventive blues from Examples 18 and 19, whereas color loss was taken place for Reactint® Blue X3LV. This suggests that the inventive blue colorants are high amine catalyst stable.

j) High TDI Index Stability of the Inventive Blue Colorants

Three standard 1.5 lb/ft3 density polyether foams containing 1 g of inventive blue colorants from Examples 18 or 19, or Reactint® Blue X17, respectively, were prepared according to the procedure described in Examples 26 and 27 (using 37 ml of 80/20 toluenediisocyanate from Bayer), immediately after the health bubble, the foams were placed in microwave for 10 min at 20% power and subsequently in a 160 C. oven for 3 min. The foams were then allowed to cool to ambient temperature and slice the bun vertically down the center and save the slices as the standard. The above processes were then repeated (still using the same amount of inventive blue colorants from Examples 18 or 19, or Reactint® Blue X17, respectively) by using 57 ml of TDI. Both respected foam slices (standard vs. the one made with high amine catalyst) were then compared reading in CMC for ΔE. An ΔE of greater than 1.0 suggests that the color loss has taken place and the respected colorant is not High TDI Index stable. According to the above procedures, no color loss was observed for the inventive blues from Examples 18 and 19, whereas color loss was taken place for Reactint® Blue X17. This suggests that the inventive blue colorants are High TDI Index stable.

k) Washability of the Inventive Blue Colorants

After application of the colorant of Example 19 to polyester swatches of fabric, the colorants easily washed therefrom with minimal amounts of water and minimal abrasive contact. Thus, the colorants exhibit excellent washability.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications that incorporate the features of the invention within the true meaning, spirit, and scope of such claims.

What I claim is:

1. An article comprising at least one polymeric formulation selected from the group consisting of at least one thermoplastic component, at least one thermoset component, and any mixtures thereof, said article also comprising at least one colorant, either present within said polymeric formulation or adhered to the surface of said polymeric formulation, wherein said colorant is a blue anthraquinone colorant wherein at least one poly(xyalkylene) chain is attached, through at least one aromatic amino group, to the 1-, 4-, or both positions of said anthraquinone colorant.

2. The article of claim 1 wherein said colorant conforms to the structure of Formula (I)

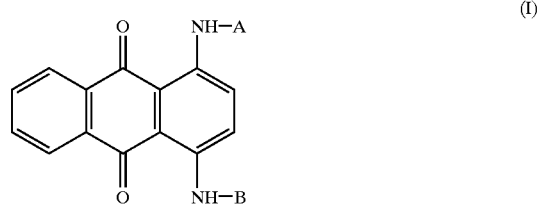

wherein A is selected from th group consisting of hydrogen, $C_1$–$C_8$ alkyl, $C_1$–$C_8$ alkoxy, and the structure of Formula (II)

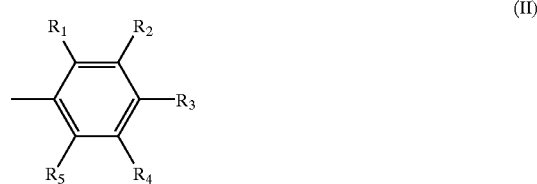

and B is selected from the group consisting of hydrogen, $C_1$–$C_8$ alkyl, $C_1$–$C_8$ alkoxy, and the structure of Formula (III)

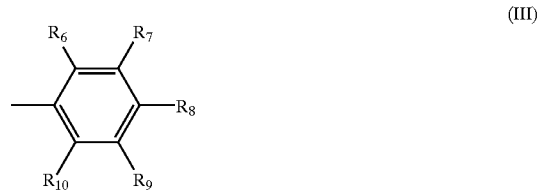

and wherein at least one of A and B is the structure of Formulas (II) or (III); wherein $R_1$, $R_2$, $R_3$, $R_4$, $R_5$, $R_6$, $R_7$, $R_8$, $R_9$, and $R_{10}$ are the same or different and are selected from the group consisting of hydrogen, $C_1$–$C_{20}$ alkyl, $C_1$–$C_{20}$ alkoxy, and Q—E, wherein Q is selected from the group consisting of N, O, S, $SO_2$, $SO_3$, $CO_2$, $SO_2N$, alkyl, and alkoxy, and E conforms to the structure of Formula (IV)

$$[\text{polyoxyalkylene constituent}]_z R' \quad (IV)$$

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof, and R' is selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ $C_{1-20}$ alkylsufonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, $R_5$, $R_6$, $R_7$, $R_8$, $R_9$, and $R_{10}$ is Q—E.

3. The article of claim 2 wherein said anthraquinone colorant conforms to the structure of (V)

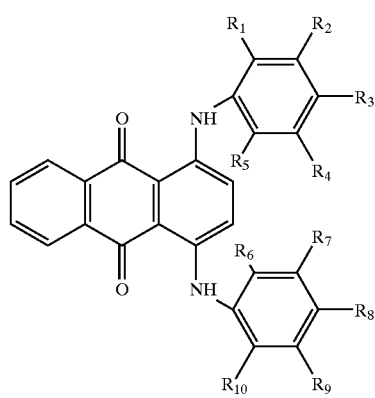

(V)

wherein $R_1$, $R_2$, $R_3$, $R_4$, $R_5$, $R_6$, $R_7$, $R_8$, $R_9$, and $R_{10}$ are the same or different and are selected from the group consisting of $C_{1-20}$ alkyl halo, hydroxyl, hydrogen, cyano, sulfonyl, sulfo, sulfato, aryl, nitro, carboxyl, $C_{1-20}$ alkoxy, and Q—E, wherein at least one of $R_1$, $R_2$, $R_3$, $R_4$, and $R_5$ is Q—E, or at least one of $R_6$, $R_7$, $R_8$, $R_9$, or $R_{10}$ is Q—E, wherein Q is selected from the group consisting of N, O, S, $SO_2$, $SO_3$, $CO_2$, and E is represented by the Formula (VI)

$$[\text{polyoxyalkylene constituent}]_z R' \quad (VI)$$

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof, and R' is selected from the group consisting of hydrogen, $C_{1-20}$ alkoxy, $C_{1-20}$ alkyl, and $C_{1-20}$ esters.

4. The article of claim 2 wherein said anthraquinone colorant conforms to the structure of (V)

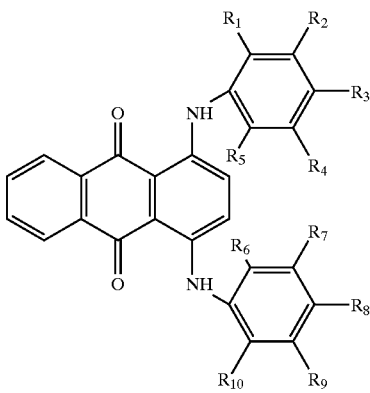

(V)

wherein $R_1$, $R_2$, $R_3$, $R_4$, $R_5$, $R_6$, $R_7$, $R_8$, $R_9$, and $R_{10}$ are the same or different and are selected from the group consisting of $C_{1-20}$ alkyl, halo, hydroxyl, hydrogen, cyano, sulfonyl, sulfo, sulfato, aryl, nitro, carboxyl, $C_{1-20}$ alkoxy, and Q—E, wherein at least one of $R_1$, $R_2$, $R_3$, $R_4$, and $R_5$ is Q—E, and at least one of $R_6$, $R_7$, $R_8$, $R_9$, or $R_{10}$ is Q—E, wherein Q is selected from the group consisting of N, O, S, $SO_2$, $SO_3$, $CO_2$, and E is represented by the Formula (VI)

$$[\text{polyoxyalkylene constituent}]_z R' \quad (VI)$$

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof, and R' is selected from the group consisting of hydrogen, $C_{1-20}$ alkoxy, $C_{1-20}$ alkyl, and $C_{1-20}$ esters.

5. The article of claim 3 wherein $R_3$ is Q—E and $R_1$, $R_2$, $R_4$, and $R_5$ are all hydrogen; wherein $R_8$ is Q—E and $R_6$, $R_7$, $R_9$, and $R_{10}$ and are all hydrogen; wherein Q is O; wherein polyoxyalkylene constituent is selected from the group consisting of from 3 to 50 moles of ethylene oxide and a combination of from 2 to 20 moles of ethylene oxide and from 1 to 20 moles of propylene oxide; wherein z is 1; and wherein R' is hydrogen.

6. The article of claim 4 wherein $R_3$ is Q—E and $R_1$, $R_2$, $R_4$, and $R_5$ are all hydrogen; wherein $R_8$ is Q—E and $R_6$, $R_7$, $R_9$, and $R_{10}$ and are all hydrogen; wherein Q is O; wherein polyoxyalkylene constituent is selected from the group consisting of from 3 to 50 moles of ethylene oxide and a combination of from 2 to 20 moles of ethylene oxide and from 1 to 6 moles of propylene oxide; wherein z is 1; and wherein R' is hydrogen.

7. The article of claim 1 wherein said polymeric formulation comprises at least one thermoplastic component.

8. The article of claim 7 wherein said thermoplastic component comprises at least one material selected from the group consisting of at least one polyester and at least one polyolefin.

9. The article of claim 8 wherein said thermoplastic component is polyester.

10. The article of claim 9 wherein said polyester is polyethylene terephthalate.

11. The article of claim 8 wherein said thermoplastic component is polyolefin.

12. The article of claim 11 wherein said polyolefin is polypropylene.

13. The article of claim 1 wherein said polymeric formulation comprises at least one thermoset component.

14. The article of claim 13 wherein said thermoset component comprises at least one polyurethane.

15. The article of claim 14 wherein said article is a polyurethane foam article.

16. The article of claim 2 wherein said polymeric formulation comprises at least one thermoplastic component.

17. The article of claim 16 wherein said thermoplastic component comprises at least one material selected from the group consisting of at least one polyester and at least one polyolefin.

18. The article of claim 17 wherein said thermoplastic component is polyester.

19. The article of claim 18 wherein said polyester is polyethylene terephthalate.

20. The article of claim 17 wherein said thermoplastic component is polyolefin.

21. The article of claim 20 wherein said polyolefin is polypropylene.

22. The article of claim 2 wherein said polymeric formulation comprises at least one thermoset component.

23. The article of claim 22 wherein said thermoset component comprises at least one polyurethane.

24. The article of claim 23 wherein said article is a polyurethane foam article.

25. The article of claim 3 wherein said polymeric formulation comprises at least one thermoplastic component.

26. The article of claim 25 wherein said thermoplastic component comprises at least one material selected from the group consisting of at least one polyester and at least one polyolefin.

27. The article of claim 26 wherein said thermoplastic component is polyester.

28. The article of claim 27 wherein said polyester is polyethylene terephthalate.

29. The article of claim 26 wherein said thermoplastic component is polyolefin.

30. The article of claim 29 wherein said polyolefin is polypropylene.

31. The article of claim 3 wherein said polymeric formulation comprises at least one thermoset component.

32. The article of claim 31 wherein said thermoset component comprises at least one polyurethane.

33. The article of claim 32 wherein said article is a polyurethane foam article.

34. The article of claim 4 wherein said polymeric formulation comprises at least one thermoplastic component.

35. The article of claim 34 wherein said thermoplastic component comprises at least one material selected from the group consisting of at least one polyester and at least one polyolefin.

36. The article of claim 35 wherein said thermoplastic component is polyester.

37. The article of claim 36 wherein said polyester is polyethylene terephthalate.

38. The article of claim 35 wherein said thermoplastic component is polyolefin.

39. The article of claim 38 wherein said polyolefin is polypropylene.

40. The article of claim 4 wherein said polymeric formulation comprises at least one thermoset component.

41. The article of claim 39 wherein said thermoset component comprises at least one polyurethane.

42. The article of claim 40 wherein said article is a polyurethare foam article.

43. The article of claim 5 wherein said polymeric formulation comprises at least one thermoplastic component.

44. The article of claim 43 wherein said thermoplastic component comprises at least one material selected from the group consisting of at least one polyester and at least one polyolefin.

45. The article of claim 44 wherein said thermoplastic component is polyester.

46. The article of claim 45 wherein said polyester is polyethylene terephthalate.

47. The article of claim 44 wherein said thermoplastic component is polyolefin.

48. The article of claim 47 wherein said polyolefin is polypropylene.

49. The article of claim 5 wherein said polymeric formulation comprises at least one thermoset component.

50. The article of claim 49 wherein said thermoset component comprises at least one polyurethane.

51. The article of claim 50 wherein said article is a polyurethane foam article.

52. The article of claim 6 wherein said polymeric formulation comprises at least one thermoplastic component.

53. The article of claim 52 wherein said thermoplastic component comprises at least one material selected from the group consisting of at least one polyester and at least one polyolefin.

54. The article of claim 53 wherein said thermoplastic component is polyester.

55. The article of claim 54 wherein said polyester is polyethylene terephthalate.

56. The article of claim 55 wherein said thermoplastic component is polyolefin.

57. The article of claim 53 wherein said polyolefin is polypropylene.

58. The article of claim 6 wherein said polymeric formulation comprises at least one thermoset component.

59. The article of claim 58 wherein said thermoset component comprises at least one polyurethane.

60. The article of claim 59 wherein said article is a polyurethane foam article.

\* \* \* \* \*

UNITED STATES PATENT AND TRADEMARK OFFICE
CERTIFICATE OF CORRECTION

PATENT NO. : 6,528,564 B1
DATED : March 4, 2003
INVENTOR(S) : Jusong Xia

It is certified that error appears in the above-identified patent and that said Letters Patent is hereby corrected as shown below:

<u>Column 24,</u>
Line 23, delete "poly(xyalkylene)" and insert -- poly(oxyalkylene) --.

Signed and Sealed this

Nineteenth Day of August, 2003

JAMES E. ROGAN
*Director of the United States Patent and Trademark Office*